April 14, 1970     K. S. ETTRE     3,506,473
METHOD OF TRANSFERRING GLASS FRIT IMAGE FROM TRANSFER SHEET
Original Filed June 25, 1964     2 Sheets-Sheet 1

INVENTOR.
KITTY S. ETTRE

April 14, 1970  K. S. ETTRE  3,506,473
METHOD OF TRANSFERRING GLASS FRIT IMAGE FROM TRANSFER SHEET
Original Filed June 25, 1964  2 Sheets-Sheet 2
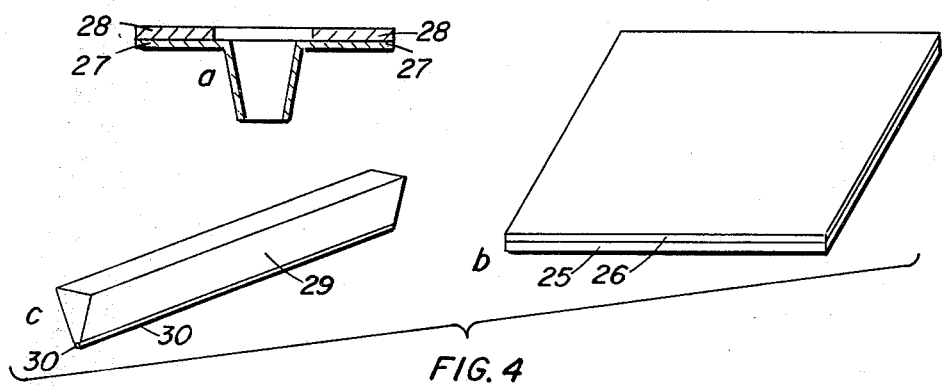
FIG. 4
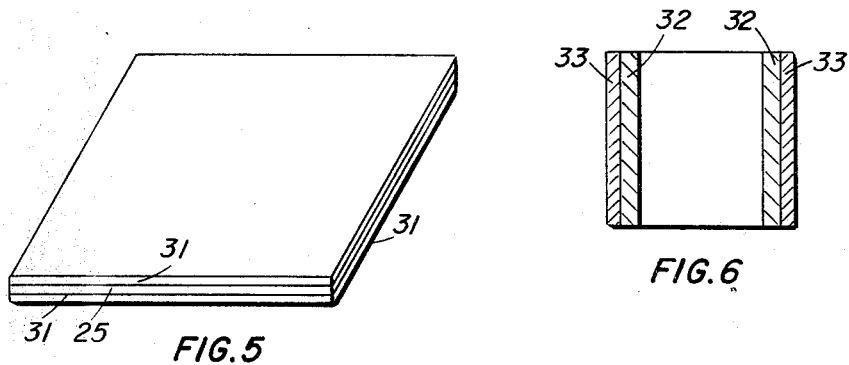
FIG. 5  FIG. 6
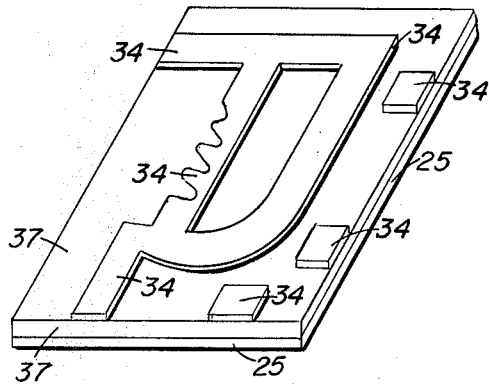
FIG. 7
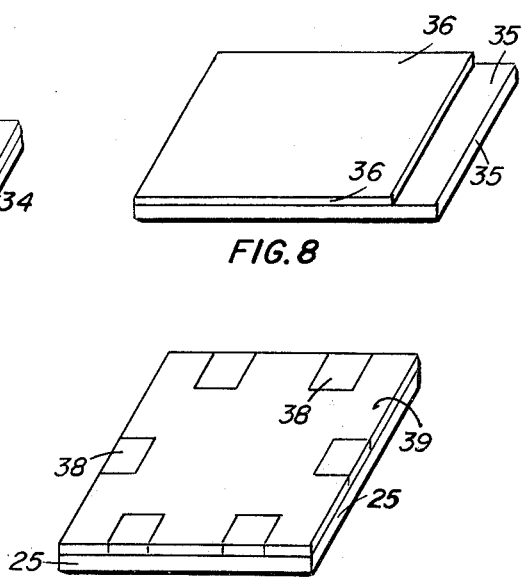
FIG. 8
FIG. 9
INVENTOR.
KITTY S. ETTRE United States Patent Office 3,506,473
Patented Apr. 14, 1970

3,506,473
METHOD OF TRANSFERRING GLASS FRIT IMAGE FROM TRANSFER SHEET
Kitty S. Ettre, Stamford, Conn., assignor, by mesne assignments, to Vitta Corporation, a corporation of Connecticut
Continuation of application Ser. No. 377,998, June 25, 1964. This application Apr. 24, 1968, Ser. No. 725,586
Int. Cl. B41m 3/12
U.S. Cl. 117—38
7 Claims

ABSTRACT OF THE DISCLOSURE

A uniform layer of glass-glazing frit suspended in a mixture of organic film forming polymer, a plasticizer and a solvent is cast under a doctor blade onto a carrier film. The film is then dried and the two-layer tape may be stored in roll form. The frit layer may be transferred to a substrate solely under pressure without the application of heat, vibratory energy, solvents, or wetting agents, and the carrier layer then stripped away, or the layer may be transferred solely under pressure as a self-supporting layer after being removed from the carrier film. An adhesive layer may be cast under a doctor blade on top of the frit layer. Specific polymers, plasticizers, solvents, and adhesives are disclosed, all of which substantially completely decompose when the frit layer is fired on the substrate. Formulas are disclosed for casting layers thinner than 1 mil and thicker than 10 mils and for casting layers to be transferred to large area and small area substrates.

CROSS-REFERENCE TO RELATED APPLICATION

This is a continuation of my earlier application, Ser. No. 377,998 filed June 25, 1964 entitled "Transferable Tapes," now abandoned. Said application is incorporated herein by reference.

This invention relates to improvements in means and methods of preparing non-conductive surfaces and has particular references to a novel glaze and ceramic film and method of applying same to conductive or non-conductive surfaces. This means and methods relate specifically to the preparation of a transferable film prepared on a carrier surface which film can be fully or partially transferred to a particular surface to be coated and which film contains selected glass, glaze or ceramic powders in a binder of selected type. It contains also a layer which makes the transfer of the highly loaded film possible by means of applying pressure or solvent or heat. Prior art type of glass, glaze or ceramic insulator layers are actually produced by any of the "wet" techniques such as spraying, brush painting, silk screening or roller coating. All of these methods have similar characteristics. In each type of technique the powdered glass, glaze or ceramic material is dispersed in a liquid, containing binder, solvent and plasticizer besides the powders. This paint is then applied to the surface to be coated, always in wet form. These methods, however, have many disadvantages.

A primary one is that the concentration and viscosity of the suspension changes from time to time due to the evaporation of the organic solvents and this makes reproducibility of the applied layer variable not only from day to day but also from hour to hour during production. Further, the drying of the coating on the ceramic surface presents a problem. It has been found that the combination of the liquid, its concentration and viscosity of the fluid are of considerable importance in obtaining a uniform coating of the right thickness on the desired surface.

Glazed ceramics used as micro-circuit boards are, particularly, extremely sensitive to any variation in the thickness, density and smoothness of the glaze layer. Known glazing methods utilizing liquid suspensions which if mass production is necessary require a large inventory of tools and expensive machinery.

Another disadvantage is that the thickness and density and the amount of deposited powdered material cannot be determined in advance but only after the layer is prepared which makes the quality control of the process a burden. As the thickness and density, which both are of utmost importance in the preparation of layers like glazed ceramics or ceramic dielectrics cannot be controlled in advance, the finished product has to be rejected and if tested the testing can be only destructive; so, reproducibility is always the greatest problem.

Other methods which could be used for depositing patterns of non-conductive layers are the methods called decalcomania. In this process the required exact pattern has to be printed on a carrier film and transferred from there to the desired surface. This method utilizes some of the known printing processes which could be silk screening or other types utilizing a printing press. The disadvantage of this method is that the exact pattern must be printed on the carrier and the transfer must be made by utilizing exact positioning tools so that the pattern should come exactly to the desired place on the desired surface.

Another disadvantage of this printing type decalcomania process is that the thickness of the consecutive prints cannot be accurately reproduced.

It is another disadvantage that if the entire surface has to be coated such a technique is not very useful especially if a large surface has to be produced.

The two foregoing types of methods have a common disadvantage, namely, that the thickness range of the coating cannot be varied in a wide range. It is especially disadvantageous to prepare thin coatings in the range below 1 mil and thick coatings above 2 mils.

Another method is to prepare self-supporting films utilizing suitable binders and powdered materials and applying this self-supporting film to the surface by punching out suitable preforms and placing it to the desired surface.

The disadvantage of this technique is that thin layers cannot be produced this way and that the production of preforms requires utilization of tools in connection with sometimes precious and sensitive films.

Other disadvantages that the storing and protecting of the sensitive layers cannot be well achieved in this way.

Accordingly, a primary objective of this invention is to provide a prefabricated layer which is protected during the storage, can be produced in exact thickness and density, and which thickness and density can be tested before the utilization of the layer.

Another objective is to produce transferable glass, glaze or ceramic layers in a variety of exact thicknesses in the range desired for the specific application.

Another objective is that this layer should be transferable to the desired surface covering the entire surface or in any shape or only to a desired area on a desired surface.

Another objective is to provide a mass production method for producing glazing or insulating layers with a uniformly smooth surface which may be provided in uniformly controlled density and thickness.

Another objective is to provide a continuous film which is transferable from its carrier to the desired surface only where applying pressure to the backing of the carrier or from the side of the film or the same with the heat or a solvent. Such pressed places should adhere to the desired surface while other places not receiving pressure or heat or solvent should adhere to the carrier film as before.

Thus, a pattern may be transferred or an entire surface coated as desired using the same tape.

Another objective is to provide a tape or film of the above characteristics wherein the plastic binder material therein will be substantially completely eliminated at elevated temperature without leaving wastes which would destroy the uniformity of the film, which will not leave any undesirable residue on the surface and which will not result in cracks or peeling of the layer after heating.

Another objective is to provide economical means and methods of preparing glazes or insulating ceramics.

Other objectives and advantages of the invention will become apparent from the following descriptions taken in connection with the accompanying drawings where:

FIGURE 4 is showing the different applications of glass transferable tapes to various bodies in accordance with this invention.

FIGURE 5 shows a ceramic dielectric insulator layer over both sides of a disc.

FIGURE 6 shows a metal cylinder where the outside surface is glazed in accordance with this invention.

FIGURE 7 is an elevational view of a micro-circuit board where the glazing and insulators are made utilizing this invention.

FIGURE 8 shows a semiconductor coated for protection with a glaze according to this invention.

FIGURE 9 shows a ceramic wafer where metal conductors are sealed to it by utilizing a glaze in accordance with this invention.

Figure 3:
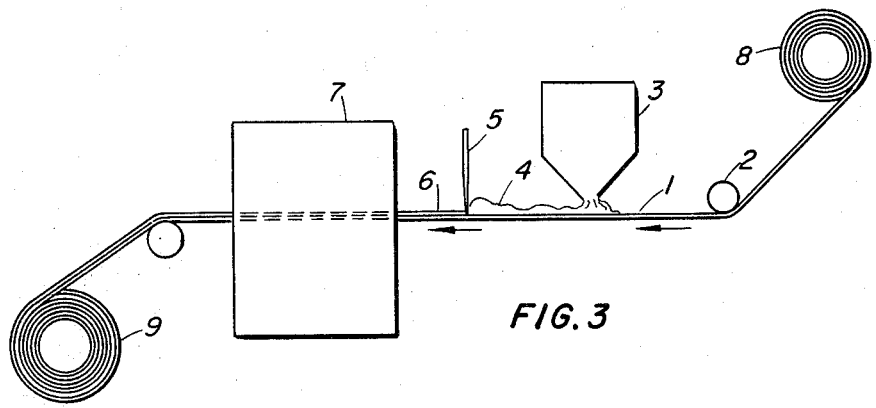
FIGURE 3 is a subsequent view illustrating a method of making the transferable film in accordance with this invention.

In accordance with the objectives of this invention, we have utilized a transferable tape technique for producing a very satisfactory film for use in glazing of ceramics or producing ceramic insulator layers on ceramics or metals or using dielectric or magnetic ceramic layers on metals or ceramics or producing protective layers on semiconductors or other precious surfaces.

A slurry containing selected glasses or ceramic powder or a mixture of them, binder, plasticizer and solvent is deposited on a carrier film in a uniformly thick and smooth layer in a manner to be described hereinafter.

A third layer using an adhesive which is selected plastic materials dispersed in a solvent medium is laminated over the prepared double layer.

The carrier film utilized in the process must be inert towards the organics and inorganics materials used for the film preparation and for the adhesives. The carrier film must have good mechanical properties. The carrier film must have uniform surface qualities so that the heavily loaded film should be uniform and its release should be accomplished in a uniform manner. It was found that several carriers are suitable for this purpose; for example, such carriers are polyethylene, Teflon or paper.

The heavily loaded film contains the powdered material of the glasses or ceramic or a mixture of them, a binder and a plasticizer. In the glazing of ceramics it was found, for example, that the role of the binder and the plasticizer is of considerable importance. Cellulose nitrates or ethyl cellulose have been commonly used as binders for glazing liquids deposited by painting or spraying methods. Although nitrocellulose can be used in glazing tape or film of the presently described type, nitrocellulose does not support as a binder large amounts of the selected glass powders. This definitely results in a somewhat low density glazing which is undesirable in some cases. Furthermore, nitrocellulose film also is inclined to become brittle and to harden slightly during aging or under influences of light affecting storing qualities of the prepared film. We have found that over the common organic resins having better film forming characteristics polyvinylalcohol and polymethacrylates give particularly excellent results as binders. For example, for using poly-n-butyl methacrylate as a binder, it is possible to prepare high density glazing film with as little as about 2% binder and the resultant film will be substantially unaffected by light or aging. Not more than 16% binder is preferred for the best results. We found in this respect that the transition from the carrier to the object to be coated is influenced to a considerable degree by the binder, its concentration and also by the plasticizer.

It is desirable in many cases that the binder completely decomposes or evaporates during process so as to leave no solid organic residue in the coating. This is particularly true in connection with the manufacture of glass-to-metal seals, micro-circuit components, where the residue may become a deleterious contaminate. In such cases polymethacrylates are particularly desirable as binder because during the glazing under sintering processes the polymethacrylates leave as gaseous products with little or no solid organic residue remaining in the coating.

A plasticizer is used as a part of the binder to give the film a softening effect without affecting the other properties of the film. It is preferable here that the plasticizer similar to the resin should also leave the layer at elevated temperature without leaving an organic residue or should have any harmful effect on the powder material in the film or on the substrate where the film is deposited. The concentration of the plasticizer is extremely important and the percentage of the plasticizer relative to the binder must be very exactly chosen in order to achieve the effect which is the subject of this invention. It was found that for different types of applications a different composition of the layer is necessary. It was found that the percentage of the plasticizer to the binder must be changed if the layer is made to be transferred to large areas or if it has to adhere only to a minuscule pattern.

In accordance with this invention plasticizers such as sucrose acetate isobutyrate, dibutyl phthalate and diethyloxalate may be used successfully with poly-n-butyl methacrylate and glycerine with polyvinyl alcohol. The plasticizer specified above decomposed completely and has an excellent softening effect on the resin. It was also found that utilizing these plasticizers in combination with the mentioned binder, the requested change in the transfer characteristics of the tape can be achieved.

It was found that for tapes transferable to large areas a ratio of 85% solid powder, 9% binder and 6% plasticizer gave satisfactory results while for tapes utilized for transferring patterns this ratio had to be changed to 85% solid powder, 7.5% binder and 7.5% plasticizer.

Another example is when 94% solid powder was used; then tapes utilized to be transferred on large areas contained about 4% binder and 2% plasticizer and this was changed to a composition of 94% solid powder, 3% binder and 3% plasticizer for tapes transferable in fine pattern.

These examples demonstrate that we were able to use our transferable tape to produce low or high density coatings on large areas or in fine patterns by changing the solid content of the tape in the range of 60% to 98% of the total and by changing the binder to plasticizer ratio in the range of 1:2 to 5:1 where the first number relates to the amount of binder relative to the amount of plasticizer which is represented by the second number.

Furthermore, it was also found that using a combination of different binders or plasticizers may be also very helpful for producing tapes transferable in different patterns. An example is when 92% solid powder was used we could achieve good transferable tapes by utilizing 4% poly-n-butyl methacrylate, 2% sucrose acetate isobutyrate and 2% dibutyl phthalate mixture.

It is understood that the above examples and ratios are not limiting the process and other ratios and amounts can as well be used to achieve transfer effect of tapes.

The solvent utilized to produce the slurry can be acetone, but amyl acetate, benzene or water may also be used. It was also found that the mixture of different solvents such as acetone and ethyl alcohol, or ethyl alcohol and benzene, or water and ethyl alcohol are very useful and the casting of films with different thickness values require a different composition of these solvents.

We found that the preparation of thick transfer films where the thickness is above 10 mil cannot be achieved in most cases by a single solvent such as acetone but a mixture of acetone and amyl acetate is more suitable for this purpose. On the other hand, thin layers where the thickness is below 1 mil, ethyl alcohol is an extremely useful solvent medium.

It is particularly pointed out that the term glass or ceramic powder is used herein to include any of the components which are known to be used as glazes utilized for preparing glazed ceramic substrates, protective coatings, or glass-to-metal seals. The ceramic materials refer to insulator ceramic materials, dielectric ceramic materials, piezo electric materials or ferrite materials. Also the term glaze or ceramic material is intended to encompass a combination of these materials such as alumina oxide or $SiO_2$ or barium titanate. One example of a glazing material is a lead glass which can be described with the following chemical forms $SiO_2$ 68%, PbO 15%, $Na_2O$ 10%, $K_2O$ 6% and CaO 1%. Another example is a boro silicate glass material which can be described by the following chemical forms $SiO_2$ 80%, $B_2O_3$ 14%, $Na_2O$ 4%, and $Al_2O_3$ 2%. An example of dielectric material is barium titanate which can be described with the following chemical form $BaTiO_3$. Another example is a ceramic material which is a mixture of different inorganic oxides as described with the following chemical forms $Al_2O_3$ 92%, CaO 3%, $SiO_2$ 3% and $H_2Mg_3(SiO_3)_4$ 2%. It is understood that other materials and a combination of these can also be prepared in tape form and the actual amounts of the ingredients may be varied within wide ranges. In preparing the film the actual materials must be compiled in a mixture so as to provide the required degree of the glaze or ceramic material. One film may be produced wherein the mixture is a film forming product containing about 90% by weight of the selected glass or about 7% by weight of the poly-n-butyl methacrylate and about 3% by weight of plasticizer. This composition was homogenized by continuous agitation using acetone as a solvent and then spread evenly upon a feed of polyethylene. The method of forming the glazing tape is clearly depicted in FIGURE 3.

The glazing tape described above can be applied to a ceramic surface by first separating it from the carrier film and using it as a self-supporting film or it can first be applied to the ceramic surface after which the carrier may be removed. The glazing film itself may be secured to the ceramic surface by thermal sealing or by the use of a suitable solvent to form a bond to the substrate and achieve the transfer. This suitable solvent can be of the fast evaporating type or it can be a slow drying material. Both polar and non-polar organic solvents are suitable for use with this technique.

It was found that in certain cases solvents which are inert towards the glazing film can be excellently as well used. Such solvent is, for example, water, cyclo hexanol or ethyl alcohol.

We found that in connection with glazing and ceramic transferable tapes pressure sensitive adhesives can also be used to facilitate the transfer. We found that different types of slurries can be spread on the transferable tape which are generally known for their lasting adhesive qualities.

The criteria of spreading such adhesive layers onto the transferable tape surface is that the solvent of the adhesive slurry should wet the surface of the transferable tape and that it should not dissolve any of the plastics or plasticizers used in the preparation of the transferable heavily loaded tape.

Another criteria of this adhesive is that it should completely decompose or evaporate at higher temperatures; it should leave the transferred layer without causing pin holes, cracks or any other residues which may be harmful on the layer. It shouldn't contain any material which may attack the powders dispersed in the transferable tape or the carrier. We found that several types of such adhesive slurries could be successfully used in combination with glass or ceramic transferable tapes. Such adhesives can be water base, solvent base or water or solvent base types. In particular, we found starch, polyvinyl alcohol, synthetic rubber and acrylate types very useful but other types can as well be used.

For the procedure of producing the adhesive layer as a third layer on the transferable tape, the machine described in FIGURE 3 can be well utilized. In this case the procedure is similar as described above except the tank 3 contains now the adhesive slurry and the spindle 8 carrier now the double layer tape containing the carrier and the heavily loaded transfer film. In this case a protective paper may be utilized which may be on a separate roller and which is then fed on to cover the tacky surface of the adhesive. This four layer tape comprised from the carrier, the heavily loaded transferable film, the adhesive layer, and the protective paper is wound up on a roll and is stored in such a way. The protective paper is removed before the application of the tape. It is understood that the protective paper is not a necessary part of this process but it is necessary to have a protective layer for this type of transferable film for storage purposes if it is stored in rolled form. The protective layer can be formed, however, on the back side of the carrier film or a carrier film can be chosen which is not adhering to the adhesive layer. In this case the film can be wound up without utilizing a protective paper.

Another way to produce adhesive coated transferable tapes is that the adhesive layer is laminated on a separate carrier film, which carrier film can be polyethylene, paper, or Mylar or the same treated with a releasing agent. This laminated adhesive layer can be stored separately or brought with the transferable tape together immediately. If it is stored separately, the adhesive layer is transferred to the transferable tape before it is utilized.

Figure 1:
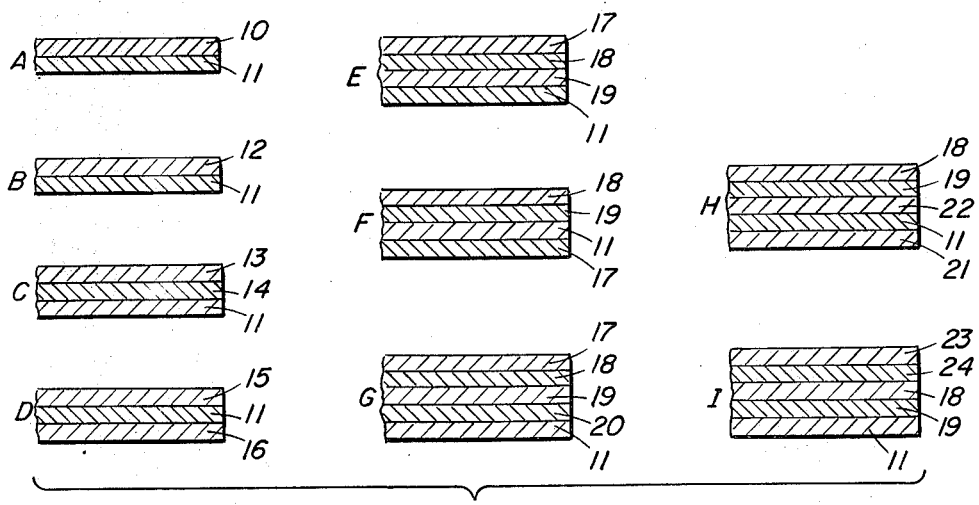
FIGURE 1 is fragmentary perspective view of sections of transferable tapes made in accordance with this invention.

Several examples of transferable tapes are shown in FIGURES 1–A through 1–I.

FIGURE 1–A shows a carrier film 11 and coated with a transferable tape 10.

FIGURE 1–B shows a transferable tape according to the invention where a carrier film 11 is equipped with a transferable layer 12 according to the invention in which adhesive material is intermixed.

FIGURE 1–C shows a transferable tape according to this invention where 11 is a carrier film, 14 is a transferable tape where the adhesive is intermixed and 13 is a protective coating.

FIGURE 1–D shows a carrier 11, the transferable tape in which the adhesive material is incorporated is shown as 15 while 16 shows a protective layer coated on the carrier.

FIGURE 1–E shows a carrier 11 coated with a transferable tape 19 which is coated with a layer of adhesive 18 covered with a removable protective layer 17.

FIGURE 1–F shows an arrangement where the carrier 11 is coated with a transferable tape 19 which is covered by an adhesive layer 18 and the protective layer 17 is now on the back side of the carrier.

In FIGURE 1–G an arrangement is shown in which a carrier film 11 is coated with a surface coating to facilitate the release of the transfer tape 20. The transfer tape 19 is spread on this release coating, the adhesive layer 18 is spread on the transferable tape while 17 is a removable protective layer.

FIGURE 1–H shows a carrier film 11 according to the invention, the backing of which is coated with a protective layer 21. The carrier film is also equipped with a surface coating 22 on which the transferable tape 19 is spread which is again coated with an adhesive layer 18.

FIGURE 1–I shows an arrangement where the carrier 11 is coated with the transfer tape 19 which is again coated with an adhesive layer 18. This adhesive layer is covered by a protective layer 23 which is coated to facilitate its release by a release coating 24.

It is the understanding of the invention that these layers must not be produced in consecutive lamination but each of the layers can be produced separately or in steps and can be brought together at a later time in order to form the configuration shown in FIGURES 1–A to 1–I.

Other configurations which are variations of the above can also be used and are understood to be a part of this invention.

Figure 2:
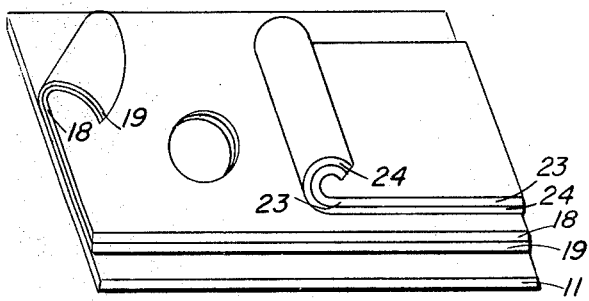
FIGURE 2 illustrates the removability of the glass, glazing or insulating film from its carrier film.

An illustration of one of these transferable tapes is shown in FIGURE 2. In this figure, 11 shows a carrier film from which the transferable tape 19 is partially removed. The adhesive layer, however, is still firmly attached to the transferable tape. The protective layer 23 is removed from the adhesive but the release layer 24 is firmly attached to the protective layer. This figure shows also a place where a round shaped pattern was already transferred to a substrate according to the invention.

FIGURE 3 is an arrangement which makes it possible to produce transferable tapes according to this invention. It can be seen that a carrier film 1 is carried by spool 8 from which it passes over a guide roller 2 and beneath a tank 3 which contains the slurry. The carrier film 1 is adapted to move in the direction indicated by arrows and as it moves, a supply of slurry 4 is deposited on its upper surface and is carried beneath a flat profile blade 5 which smooths the mixture. Blade 5 is adjustable perpendicularly to the surface of the film so as to provide the layer of the mixture with controlled uniform thickness. After the carrier film is thus provided with a uniformly thick and smooth layer, it is dried in any suitable means such as dryer 7 whereby the film forming layer 6 becomes removably attached to the carrier film 1. The resultant laminated tape or film then passes to a spool 9 on which it is wound for storing. Tapes consisting of more layers can be produced in running this laminated tape several times over the machine thus achieving any of the layer structures shown in FIGURE 1 or can be laminated consecutively in the same operation or can be made in separate manufacturing processes utilizing a spreading technique and then put together on a single roll at the end of the last process or can be stored in separate rolls and then brought together just before the usage of the tape.

FIGURE 4–A is showing an arrangement in which a metal part is equipped with a glazed surface. In this case the metal part 27 is pressed towards the transferable tape, the tape at the contacted areas then adheres to the metal and the glazing tape 28 adheres to the metal surface. The glazing is then produced by a subsequent firing procedure.

FIGURE 4–B shows a ceramic wafer 25 which was equipped with a glaze 26 by pressing the transferable tape according to this invention to the ceramic wafer 25 and transferring the glaze tape 26 to the ceramic.

FIGURE 4–C shows an arrangement where only the edge of a ceramic wedge is coated with glazing tape in order to produce a narrow glazed line on the ceramic. The ceramic wedge 29 was pressed against the transferable tape or the transferable tape can also be pressed against the rod while the glazing tape is adhering to the ceramic wedge only on the points which come in contact with each other. The glazing tape 30 is then adhering to these points.

FIGURE 5 shows a ceramic wafer 25 which is coated on both sides with ceramic insulator tape 31 according to the invention. This ceramic insulator tape can be consequently fired in order to achieve a sintered layer.

FIGURE 6 shows the application of this invention for covering the outside diameter of a metal tube with a glaze. The metal tube 32 is coated with the transferable glaze tape 33 according to the invention.

FIGURE 7 shows an application in which a ceramic wafer 25 is coated with a glaze 37 according to the invention; in another step one or more ceramic materials are transferred on the glazed ceramic by utilizing a die and pressing a pattern to the glazed ceramic surface. In this case the pattern 34 adheres to the glazed ceramic at the points the tool is pressing the tape and is not adhering at any other points. The layer is then firmly bonded to the substrate material. In certain cases it is understood that this adhesion can be increased by a heat treatment.

FIGURE 8 shows an application where a semiconductor surface 35 is coated by a protective glaze 36 according to the invention.

FIGURE 9 shows an application where a ceramic wafer 25 is coated with the transferable glazing tape 39 according to the invention into which metal conductors 38 are pressed to achieve firmly bonded conductive lands.

These examples show a variety of applications of the transferable tapes for different devices. It was found that the devices produced by the transferable tape technique show superior characteristics compared to those produced by spraying, painting, silk screening or the decalcomania process. This is believed to be accomplished at least partly by the better control of uniformity in density, thickness and surface smoothness achieved by the presently described techniques and the adaptability of the film to the surface of various shapes and sizes with the ease of transferring. It is also to be believed that this technique makes the automation of such processes possible.

From the foregoing it will be apparent that novel means and methods have been presented in accordance with the objectives of these inventions for performing glazing ceramics or metals or equipping them with ceramic layers or patterns. It is to be understood, however, that various changes in the means and methods described may be made by those skilled in the art but not departing from the spirit of the invention as expressed in the accompanying claims.

I claim:
1. The method of providing a glass layer of uniform thickness on a refractory substrate comprising the steps of:
   (A) casting a releasable layer of uniform thickness under a doctor blade onto a thin flexible carrier film
      (a) said releasable layer comprising a powdered glazing frit of sufficient density to fuse to a uniform continuous glass-glazing layer of uniform thickness, and
      (b) an organic film-forming polymer matrix for said frit which decomposes into volatile components at the fusing temperature of said frit; and
   (B) transferring an image from said uniform releasable layer to the substrate to be glazed by bringing said layer into contact with the substrate solely under pressure applied to the area of the image to be transferred without the application of heat, vibratory energy, solvents, or wetting agents; and
   (C) heating the substrate and said transferred layer to the fusing temperature of said frit to form a continuous glass layer of uniform thickness thereon.

2. The method defined in claim 1 wherein:
   (a) the outer surface of said releasable layer has a greater adhesion for the substrate than the inner surface thereof has for said carrier film, and
   (b) said transferring step is carried out with said layer adhered to said carrier film and then stripping the carrier film from the transferred layer.

3. The method defined in claim 1 wherein said polymer is chosen from the group consisting of nitrocellulose, polyvinyl-alcohol, and polymethacrylates.

4. The method defined in claim 3 wherein said casting step is carried out by mixing said frit and said polymer with solvent chosen from at least one of the group consisting of acetone, amyl acetate, benzene, ethyl alcohol, water and cyclo hexanol.

5. The method defined in claim 4 wherein said releasable layer is one mil or less thick and said solvent consists essentially of ethyl alcohol.

6. The method defined in claim 4 wherein said releasable layer is at least 10 mils thick and said solvent consists essentially of a mixture of acetone and amyl acetate.

7. The method defined in claim 4 wherein said casting step is carried out by mixing said frit, said polymer and said solvent with a plasticizer chosen from the group consisting of sucrose acetate isobutyrate, dibutyl phthalate, diethyloxalate, and glycerine.

References Cited

UNITED STATES PATENTS

| | | |
|---|---|---|
| 2,311,876 | 2/1943 | Scheets. |
| 2,334,585 | 11/1943 | Schieman _____ 161—167 |
| 2,682,480 | 6/1954 | Andrews. |
| 2,776,235 | 1/1957 | Peck _____ 117—36.1 |
| 2,966,719 | 1/1961 | Park _____ 264—66 |
| 3,062,676 | 11/1962 | Newman et al. _____ 117—36.4 |
| 3,218,959 | 10/1965 | Varadi et al. _____ 161—167 |
| 3,293,072 | 12/1966 | Doolittle et al. |

MURRAY KATZ, Primary Examiner

U.S. Cl. X.R.

117—36.4, 138.8, 155; 161—167